United States Patent [19]

Vollenweider, II

[11] Patent Number: 4,774,121

[45] Date of Patent: Sep. 27, 1988

[54] CORE FOR COMPOSITE STRUCTURES

[76] Inventor: Edward E. Vollenweider, II, 3181 Big J. Dr., Highland, Mich. 48031

[21] Appl. No.: 874,516

[22] Filed: Jun. 16, 1986

[51] Int. Cl.[4] .............................................. B32B 3/12
[52] U.S. Cl. ..................... 428/117; 144/333; 264/46.5; 264/261; 428/537.1
[58] Field of Search ............. 428/117, 116, 17, 537.1; 264/158, 162, 46.4, 46.5, 46.9, 101, 259, 261; 144/333

[56] References Cited

U.S. PATENT DOCUMENTS

| | | | |
|---|---|---|---|
| 2,282,421 | 5/1942 | Luby | 428/116 |
| 2,477,852 | 8/1949 | Bacon | 428/116 |
| 2,744,042 | 5/1956 | Pace | 264/261 X |
| 3,419,455 | 12/1968 | Roberts | 428/314.4 X |
| 3,993,813 | 11/1976 | Grieco et al. | 264/158 X |
| 4,050,978 | 9/1977 | Moore | 428/116 X |
| 4,068,429 | 1/1978 | Moore | 428/116 X |
| 4,179,540 | 12/1979 | Smarook | 521/98 X |
| 4,351,680 | 9/1982 | Kohn | 264/158 X |
| 4,444,911 | 4/1984 | Norata et al. | 521/82 |
| 4,468,363 | 8/1984 | Miessler | 264/261 X |
| 4,550,003 | 10/1985 | Sakata et al. | 521/60 X |
| 4,655,981 | 4/1987 | Nielsen et al. | 264/284 X |
| 4,690,874 | 9/1987 | Sauer et al. | 428/537.1 |

FOREIGN PATENT DOCUMENTS

| | | | |
|---|---|---|---|
| 235534 | 1/1964 | Austria | 428/119 |
| 164141 | 12/1980 | Japan | 144/333 |
| 56-17250 | 2/1981 | Japan | 428/119 |

Primary Examiner—Henry F. Epstein
Attorney, Agent, or Firm—Harness, Dickey & Pierce

[57] ABSTRACT

An improved core structure is provided for composite structures and particularly those employing fiberglass reinforced plastic surface layers. In accordance with this invention, a composite article is formed having a central layer comprised of a plurality of elongated hollow rod like members which are supported by a retaining material. The rod members are preferably made from a naturally occurring hollow material such as bamboo stalks. The retaining material is preferably a foam type plastic such as urethane, PVC, or syntactic foam. The core structure may be fabricated by loading a plurality of bamboo stalks into an elongated trough form, and then filling the trough with retaining material. Following curing, the core body is removed from the form and is sliced into plate shaped individual core pieces. The core structures are thereafter skinned with a plastic outer layer such as fiber reinforced plastic and used to develop webs, bulkheads, reinforcing members and various other features in composite structures.

9 Claims, 2 Drawing Sheets

CORE FOR COMPOSITE STRUCTURES

BACKGROUND OF THE INVENTION

This invention relates to a core structure particularly for use in articles such as boats in conjunction with composite materials such as fiberglass reinforced plastic.

Presently, most boats of the pleasure craft variety and numerous other articles are made from fiberglass reinforced plastic (FRP) materials. In fabricating such structures, it is often necessary to provide stiffening members, webs, bulkheads, and other members in order to provide the desirable structural characteristics. Often such features are of a thickness which is greater than that which can be conveniently formed from FRP materials. Typically, thick sections of FRP material require many layers of fiberglass mat and resin which are normally laid up by hand. This process is time consuming and costly since it involves a great deal of direct labor. In addition, extremely thick sections of FRP may have an unacceptably high weight for a given device. Moreover, the above problems of developing thick sections are not confined to FRP materials. It is also difficult to provide such thick sections using numerous other types of structural materials.

In order to overcome the disadvantages associated with thick sections of structural materials, such as FRP, core structures of a desired thickness are often used which are covered by skin layers. Many present boats and other articles have cores made from slices of lightweight balsa wood material. Balsa wood is frequently cut into flat plate-like slices and may be formed from multiple pieces which are held together by a fabric mat. Skin layers of FRP are applied to both sides of the balsa core to encapsulate it. Although balsa cores provide the desirable section thickness and perform satisfactorily in many respects, they have numerous disadvantages. In the event of a crack or hole in the skin layers encapsulating the core, water or other liquids can seep into the core. If this occurs, the balsa wood core may become saturated and will not readily dry out since it is not ordinarily exposed to freely circulating air. Soaking of a balsa core causes it to lose its structural characteristics and buoyancy. Another disadvantage associated with balsa wood cores is that it does not readily become wetted by the liquid FRP resin which is applied to the surfaces of the core, and consequently, a secure bond between the core and the outer skin layer is not provided. Such lack of interengagement reduces the structural integrity of the core structure. As a means of overcoming the above-mentioned lack of structural engagement between the skin and balsa wood core, the curing time of the FRP resin may be slowed to allow it to "wet" the balsa surface. This approach, however, increases cycle time leading to a production cost penalty. Balsa cores have the additional disadvantage that balsa wood material is fairly costly. Various alternate core materials have been employed with varying degrees of success. For example, plywood and aluminum honeycomb materials have been used. Such materials, however, impose cost, manufacturing or performance drawbacks.

SUMMARY OF THE INVENTION

This invention seeks to provide an improved core structure which overcomes the disadvantages of the presently available core structures such as those described previously. In accordance with this invention, a core structure is provided which is comprised of a plurality of hollow tubular rod members of filler material which are surrounded by a plastic foam retaining material. Preferably, such sections are made from a naturally occurring filler material such as bamboo stalks. In one exemplary manufacturing process, elongated sections of the core filler material such as bamboo stalks are placed into a molding cavity. The cavity is thereafter filled with a plastic foam retaining material which surrounds the stalks. After curing, the completed article is removed from the mold and is sectioned using a saw to provide plate-like core elements of a desired thickness which can be positioned and covered with a skin layer such as FRP material to provide the desired configuration. By using a hollow naturally occurring material such as bamboo stalks, a number of advantages over presently available core structures are provided. Bamboo material is extremely stiff in compression, thus providing excellent structural characteristics. Further, bamboo does not readily absorb water and thus provides floatation which is particularly advantageous for watercraft. The hollow interior cavities of bamboo stalks provide a region for the resin of the skin layers to flow into and firmly interlock with the core structure. Finally, bamboo is a readily available and inexpensive commodity.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
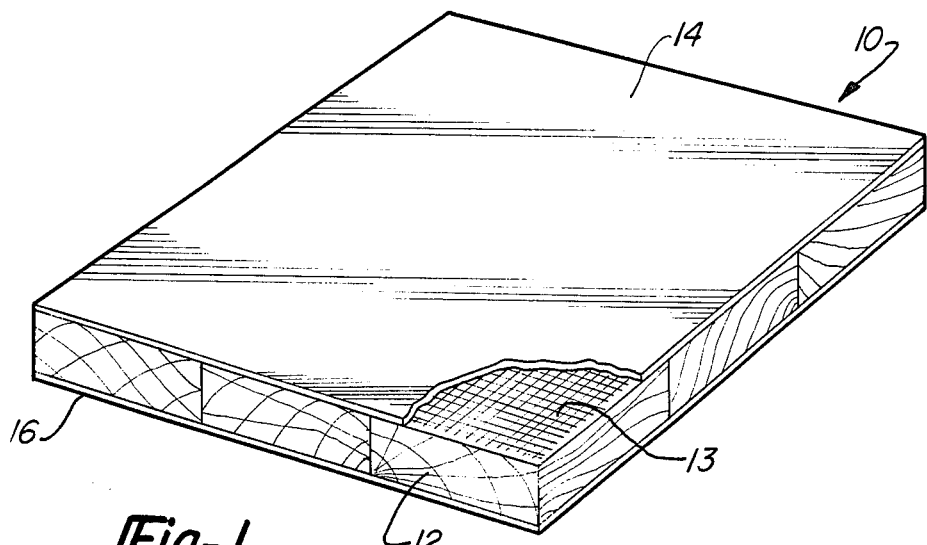
FIG. 1 is a pictorial view of a core structure in accordance with the prior art employing balsa wood as a core material.

With particular reference to FIG. 1, a core structure according to the prior art is shown which is generally designated by reference number 10. Core structure 10 is comprised of central layer 12 made of multiple pieces of balsa wood which are initially held together by one or more layers of fabric mat 13. A pair of outer skin layers 14 and 16 cover the major face surfaces of central layer 12 and are composed of a resin material which may be reinforced by a filler material such as fiberglass or graphite filaments. Core structure 10 has the disadvantages of prior art cores previously described, including cost, water soaking, and poor adhesion between layers.

Figure 2:
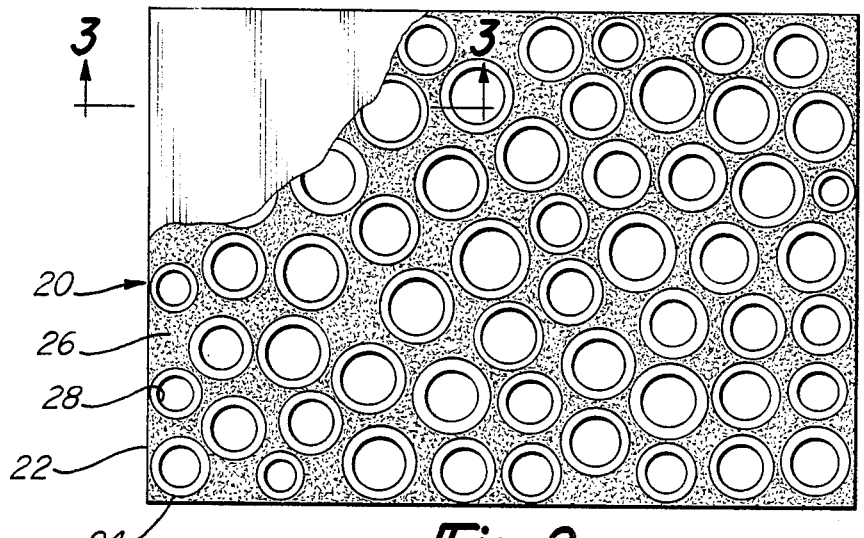
FIG. 2 is a partially cut away plan view of a core member in accordance with this invention.
Figure 3:
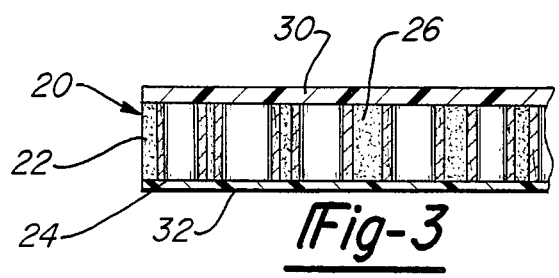
FIG. 3 is a cross-sectional view of the core members shown in FIG. 2 taken along line 3—3.

A core structure in accordance with the present invention is shown in FIGS. 2 and 3 and is generally designated by reference number 20. Core structure 20 is generally comprised of central layer 22 which is covered by outer skin layers 30 and 32.

Central layer 22 is comprised of a plurality of aligned tubular rod members 24 which are enveloped in retaining material 26 such as a foam plastic. In the preferred embodiments of this invention, members 24 are made of sectional bamboo stalk material which is tubular in shape having hollow interior cavities 28 bounded by a dense annular wall. Other tubular materials besides bamboo may be employed for defining members 24 such as corn or sunflower stalks, or other types of naturally occurring stalk or reedlike substances. Members 24 are oriented such that their longitudinal axes are perpendicular to the major face surfaces of skin layers 30 and 32. This orientation coupled with the relatively high compression strength of members 24 provide structural support for skin layers 30 and 32.

Retaining material 26 acts to support members 24 and may be formed from urethane foam, polyvinyl chloride (PVC) foam or syntactic foam material, or numerous other materials. Retaining material layer 26 may itself be mixed with materials such as fibers or microspheres or filled with inert mineral materials in order to achieve the desired structural characteristics and density. Urethane foam material is inexpensive and would be preferable in applications where lower density is acceptable or desirable. Syntactic type foams have higher compression strength, thus achieving enhanced structural characteristics, but are more dense and expensive than urethane foam material.

Outer skin layers 30 and 32 are preferably comprised of FRP material which is fabricated by placing one or more layers of fiberglass mat along the major face surfaces of central layer 22 and coating them with a thermoset type resin. As an alternative to the use of mat material, a layer of chopped non-oriented glass or other fibers which are coated with resin could be used to form layers 30 and 32. In accordance with a first embodiment of this invention, the inside cavities 28 of members 24 are devoid of retaining material 26, and the resin material of layers 30 and 32 is allowed to enter that area to thereby firmly interlock the layers with central layer 22. In applications in which cavities 28 are empty, it is desirable to limit the diameter of members 24 to prevent "sink" marks from showing on the surfaces of skin layers 30 and 32.

Figure 4:
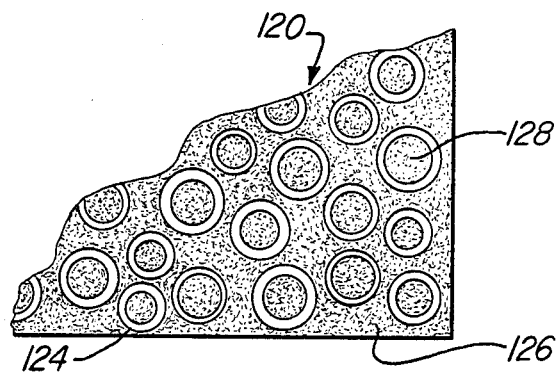
FIG. 4 is a partial cut away view of a core member in accordance with a second embodiment of a core structure in accordance with this invention.

FIG. 4 illustrates core structure 120 in accordance with a second embodiment of this invention which differs from core 20 in that interior cavities 128 of members 124 are filled with retaining material 126. This embodiment has the advantage of minimizing the sink marks mentioned above.

Figure 5:
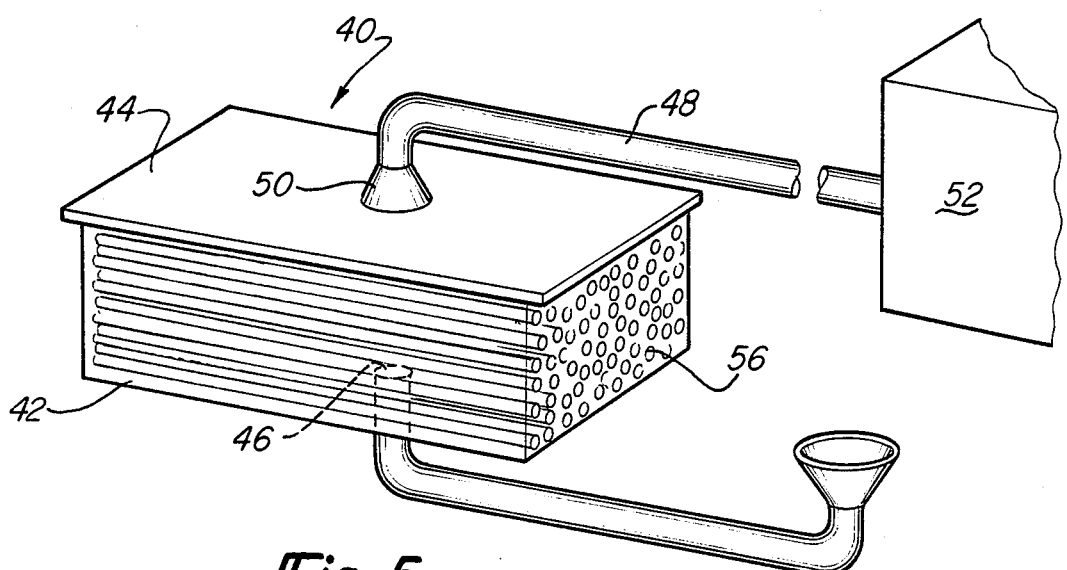
FIG. 5 is a pictorial view of an exemplary device for fabricating cores in accordance with this invention.

FIG. 5 illustrates production machine 40 adapted to form core structures 20 in accordance with the present invention. Machine 40 includes a tub-like housing 42 having an enclosing top 44 with lower retaining material injection port 46. Vacuum line 48 communicates with a vacuum port 50 in top 44 and is connected to vacuum pump 52. Machine 40 is particularly adapted for forming core structure wherein retaining material 26 is comprised of syntactic foam.

During the fabrication process, top 44 is removed and reeds of bamboo stalks cut to a preselected length are stacked in a generally parallel relationship therein. Next, top 44 is placed onto housing 42 and a vacuum is drawn inside the housing as syntactic foam material is injected into port 46. This action causes the foam material to rise within housing 42. Once the desired volume of foam is present, the material is permitted to cure and the entire core body 56 is removed from housing 42.

Thereafter, individual core members 20 are cut from the core body 56 by cross cutting using a saw or other device. For fabrication of core structures 20 using urethane or other types of foam material, it is possible to simply pour the foam material into housing 42 without employing the vacuum system of machine 40. Core members 20 are preferably cut to a preselected standard size which are used in groups or cut as desired in use.

While the above description constitutes the preferred embodiments of the present invention, it will be appreciated that the invention is susceptible to modification, variation and change without departing from the proper scope and fair meaning of the accompanying claims.

What is claimed is:

1. A method of forming a relatively lightweight composite structure comprising the steps of:
   providing an elongated molding cavity,
   providing a plurality of naturally occurring tubular rod members having hollow interior cavities,
   randomly loading said naturally occurring rod members into said molding cavity such that the longitudinal axes of said naturally occurring rod members are generally parallel to each other and allowing said rod members to establish their own relative separation and positioning,
   providing a flowable retaining material which becomes rigid after curing or cooling,
   introducing said retaining material into said molding cavity, thereby fully surrounding and filling the interstices between said naturally occurring rod members,
   curing said retaining material, thus producing an intermediate core article with randomly orientated naturally occurring rod members,
   removing said intermediate core article from said molding cavity,
   slicing said intermediate core article along planes perpendicular to the longitudinal axis of said naturally occurring rod members, thus forming plate-like members of preselected thickness, and
   covering the planar surfaces of said plate-like members with outer skin layers comprised of a fiber-reinforced plastic composite material that are bonded to said members during the curing of said outer skin layers.

2. The method of forming core structures according to claim 1 further comprising the step of drawing a vacuum inside said molding cavity to cause said retaining material to surround said rod members.

3. A method of forming a relatively lightweight composite structure comprising the steps of:
   providing an elongated molding cavity,
   providing a plurality of naturally occurring tubular rod members having hollow interior cavities,
   randomly loading said naturally occurring rod members into said molding cavity such that the longitudinal axes of said naturally occurring rod members are generally parallel to each other and allowing said rod members to establish their own relative separation and positioning,
   providing a flowable retaining material which becomes rigid after curing or cooling,
   introducing said retaining material into said molding cavity, thereby fully surrounding and filling the interstices between said naturally occurring rod members, introducing said retaining material into said hollow interior cavities of said naturally occurring tubular rod members, curing said retaining material, thus producing an intermediate core article, removing said intermediate core article from said molding cavity, slicing said intermediate core article along planes perpendicular to the longitudinal axis of said rod members, thus forming plate-like members of preselected thickness, and covering the planar surfaces of said plate-like members with outer skin layers comprised of a fiber-reinforced plastic composite material that are bonded to said members during the curing of said outer skin layers.

4. A composite structure having a lightweight, noncompressible core, comprising:

a substantially planar central core of substantially uniform thickness including a plurality of naturally occurring tubular rod members having varying diameters and hollow interior cavities that are randomly interspersed in relative close proximity throughout said core and oriented so that their longitudinal axes are perpendicular to the planar surfaces of said core and foam retaining material fully surrounding and filling the interstices between said rod members to support said rod members; and first and second outer skin layers comprised of a fiber-reinforced plastic composite material that are bonded to the planar surfaces of said central core during the curing of said first and second outer skin layers.

5. A structure according to claim 4 wherein said retaining material is syntactic foam.

6. A structure according to claim 4 wherein said retaining material is polyvinyl chloride foam.

7. A structure according to claim 4 wherein said retaining material is urethane foam.

8. A structure according to claim 4 wherein said foam retaining material further fills said hollow interior cavities of said rod members.

9. A structure according to claim 4 wherein said naturally occuring tubular rod members comprise bamboo.

* * * * *